United States Patent [19]

Weder

[11] Patent Number: 5,661,950

[45] Date of Patent: *Sep. 2, 1997

[54] METHOD OF WRAPPING A FLORAL GROUPING

[75] Inventor: Donald E. Weder, Highland, Ill.

[73] Assignee: Southpac Trust International, Inc.; not individually, but as trustee of The Family Trust U/T/A dated December 8, 1995, Charles A. Codding, Authorized Signatory for Southpac Trust International, Inc. trustee

[*] Notice: The term of this patent shall not extend beyond the expiration date of Pat. No. 5,557,882.

[21] Appl. No.: 439,568

[22] Filed: May 11, 1995

Related U.S. Application Data

[63] Continuation-in-part of Ser. No. 923,202, Oct. 13, 1992, Pat. No. 5,596,862, Ser. No. 313,675, Sep. 27, 1994, abandoned, and Ser. No. 264,866, Jun. 23, 1994, Pat. No. 5,448,875, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, said Ser. No. 313,675, is a continuation of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.[6] ............................. B65B 11/00; B65B 13/00
[52] U.S. Cl. ........................... 53/397; 53/399; 53/465
[58] Field of Search .......................... 53/397, 399, 461, 53/465, 580, 582

[56] References Cited

U.S. PATENT DOCUMENTS

| | | |
|---|---|---|
| 732,889 | 7/1903 | Paver . |
| 1,063,154 | 5/1913 | Bergen . |
| 1,446,563 | 2/1923 | Hughes . |
| 1,525,015 | 2/1925 | Weeks . |
| 1,538,277 | 5/1925 | Dula . |
| 1,865,535 | 7/1932 | Meany . |
| 1,978,631 | 10/1934 | Herrlinger .................... 91/68 |
| 2,043,829 | 6/1936 | Grant et al. .................... 93/2 |
| 2,048,123 | 7/1936 | Howard ....................... 229/87 |
| 2,170,147 | 8/1939 | Lane .......................... 206/56 |
| 2,278,673 | 4/1942 | Savada et al. ............... 154/43 |
| 2,302,259 | 11/1942 | Rothfuss ....................... 41/10 |
| 2,371,985 | 3/1945 | Freiberg ..................... 206/46 |
| 2,510,120 | 6/1950 | Leander ..................... 117/122 |
| 2,524,162 | 10/1950 | Chavannes et al. ....... 312/31 |
| 2,529,060 | 11/1950 | Trillich ...................... 117/68.5 |
| 2,621,142 | 12/1952 | Wetherell ................... 154/117 |

(List continued on next page.)

FOREIGN PATENT DOCUMENTS

| | | |
|---|---|---|
| 1166692 | 3/1964 | Germany . |
| 560532 | 4/1975 | Switzerland . |
| 1204647 | 9/1970 | United Kingdom . |

OTHER PUBLICATIONS

Exhibit A—Chantler & Chantler brochure showing Zipper Sleeve and Florasheet, Date unknown, 2 pages.
Exhibit B—Copy of photograph of Zipper Sleeve.

(List continued on next page.)

*Primary Examiner*—Linda Johnson
*Attorney, Agent, or Firm*—Dunlap & Codding, P.C.

[57] ABSTRACT

A method of wrapping a floral grouping, preferably an orchid, with a wrapper which may be a sheet of material, a sleeve or a preformed pot cover. The wrapper is preferably constructed from a laminated material made up of at least a waxy layer and a support layer which are superposed upon each other and connected or laminated to each other. A second waxy layer may be connected or laminated to the other surface of the support surface. The waxy layer is made from a waxed paper or waxed tissue. The wrapped floral grouping may also contain a shredded material for cushioning the blooms of the floral grouping.

24 Claims, 5 Drawing Sheets

U.S. PATENT DOCUMENTS

| | | | |
|---|---|---|---|
| 2,648,487 | 8/1953 | Linda | 229/55 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 9/1961 | Warp | 53/390 |
| 3,022,605 | 2/1962 | Reynolds | 47/58 |
| 3,094,810 | 6/1963 | Kalpin | 47/37 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,380,646 | 4/1968 | Doyen et al. | 229/57 |
| 3,508,372 | 4/1970 | Wallerstein et al. | 53/3 |
| 3,554,434 | 1/1971 | Anderson | 229/55 |
| 3,556,389 | 1/1971 | Gregoire | 229/53 |
| 3,620,366 | 11/1971 | Parkinson | 206/59 |
| 3,660,958 | 5/1972 | Garrison | 53/3 |
| 3,681,105 | 8/1972 | Milutin | 117/15 |
| 3,793,799 | 2/1974 | Howe | 53/32 |
| 3,869,828 | 3/1975 | Matsumoto | 47/34.11 |
| 4,054,697 | 10/1977 | Reed et al. | 428/40 |
| 4,091,925 | 5/1978 | Griffo et al. | 206/423 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,322,931 | 4/1982 | Niepmann | 53/449 |
| 4,333,267 | 6/1982 | Witte | 47/84 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,546,875 | 10/1985 | Zweber | 206/0.82 |
| 4,640,079 | 2/1987 | Stuck | 53/390 |
| 4,765,464 | 8/1988 | Ristvedt | 206/0.82 |
| 4,773,521 | 9/1988 | Weder et al. | 53/580 |
| 4,801,014 | 1/1989 | Meadows | 206/423 |
| 4,835,834 | 6/1989 | Weder | 29/525 |
| 4,941,572 | 7/1990 | Harris | 206/423 |
| 4,989,396 | 2/1991 | Weder et al. | 53/397 |
| 5,105,599 | 4/1992 | Weder | 53/399 |
| 5,111,638 | 5/1992 | Weder | 53/397 |
| 5,181,364 | 1/1993 | Weder | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,557,882 | 9/1996 | Weder | 47/44.01 |

OTHER PUBLICATIONS

Exhibit C—Guardsman Twin–Wrap Florist Paper, Hampshire Paper Company, brochure—one page, marketed around Jan. 1992 to the best of Applicant's knowledge. The brochure shows a roll of florist wrapping paper interwound with florist wax paper. Neither sheet included an adhesive for securing the wrap in a wrapped position about the flowers, and the sheets were not connected.

Exhibit D—"The Simple Solution For Those Peak Volume Periods", Highland Supply Speed Cover Brochure, 1989, 6 pages.

Exhibit E—"Speed Sheets and Speed Rolls", Highland Supply Speed Sheets Brochure, 1990, 2 pages.

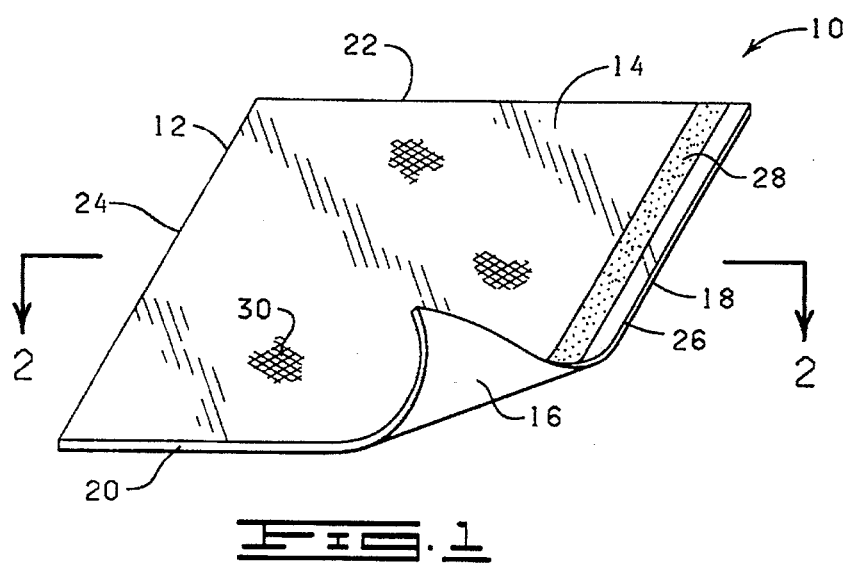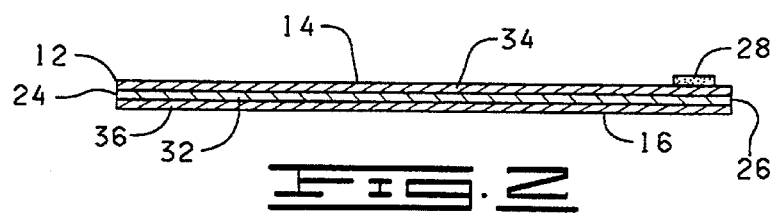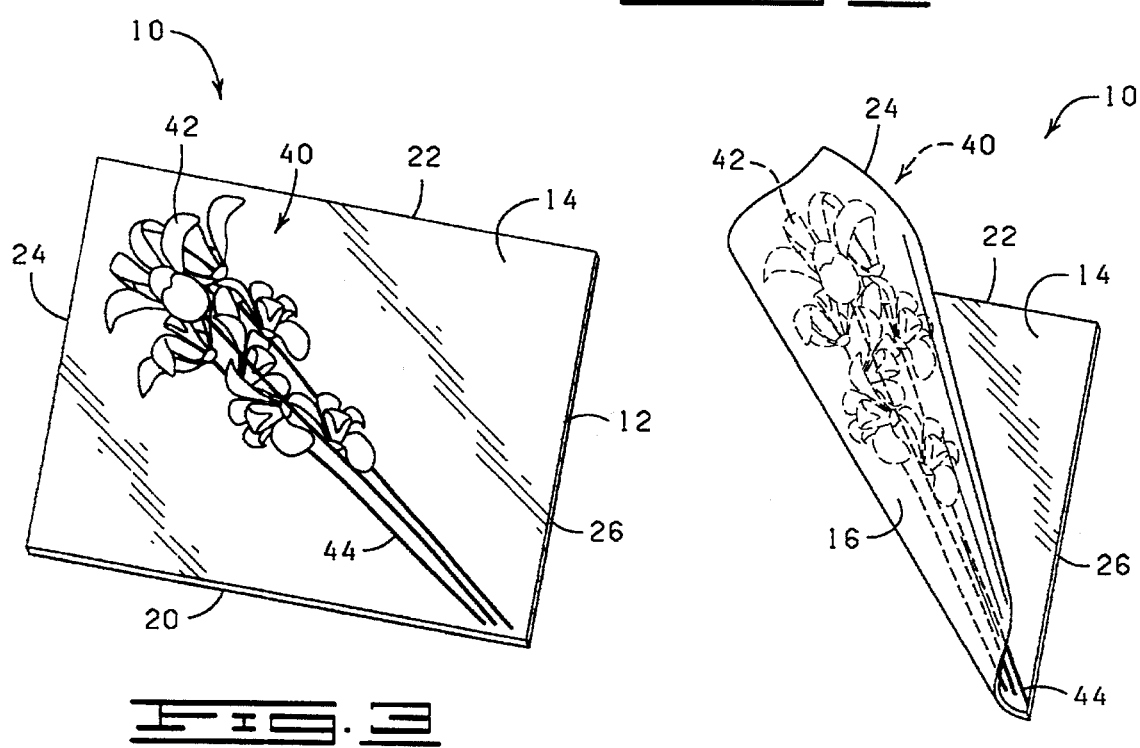

METHOD OF WRAPPING A FLORAL GROUPING

CROSS-REFERENCE TO RELATED APPLICATIONS

The present application is a continuation-in-part of U.S. Ser. No. 07/923,202, filed Oct. 13, 1992, entitled "METHOD AND APPARATUS FOR WRAPPING A FLORAL GROUPING WITH MULTIPLE SHEET WRAPPER" now U.S. Pat. No. 5,596,862.

The present application is also a continuation-in-part of U.S. Ser. No. 08/313,675, filed Sep. 27, 1994, entitled "METHOD FOR WRAPPING AN OBJECT WITH AN EMBOSSED MATERIAL", now abandoned which is a continuation of U.S. Ser. No. 08/188,183, filed Jan. 28, 1994, entitled "METHOD FOR WRAPPING AN OBJECT WITH AN EMBOSSED MATERIAL HAVING AN ADHESIVE THEREON", now U.S. Pat. No. 5,388,386, issued on Feb. 14, 1995, which is a continuation of U.S. Ser. No. 07/968,798, filed Oct. 30, 1992, entitled "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", now U.S. Pat. No. 5,369,934, issued Dec. 6, 1994, which is a continuation of U.S. Ser. No. 07/865,563, filed Apr. 9, 1992, entitled "METHODS FOR WRAPPING A FLORAL GROUPING", now U.S Pat. No. 5,245,814, issued Sep. 21, 1993, which is a continuation of U.S. Ser. No. 07/649,379, filed Jan. 31, 1991, entitled "METHOD FOR WRAPPING AN OBJECT WITH A MATERIAL HAVING PRESSURE SENSITIVE ADHESIVE THEREON", now U.S Pat. No. 5,111,638, issued May 12, 1992, which is a continuation of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON", now abandoned, which is a continuation-in-part of U.S. Ser. No. 07/219,083, filed Jul. 13, 1988, entitled "ARTICLE FORMING SYSTEM", now U.S. Pat. No. 4,897,031, issued Jan. 30, 1990, which is a continuation of U.S. Ser. No. 07/004,275, filed Jan. 5, 1987, entitled "ARTICLE FORMING SYSTEM", now U.S. Pat. No. 4,773,182, issued Sep. 27, 1988, which is a continuation of U.S. Ser. No. 06/613,080, filed May 22, 1984, entitled "ARTICLE FORMING SYSTEM", now abandoned.

The present application is also a continuation-in-part of U.S. Ser. No. 08/264,866, filed Jun. 23, 1994, entitled "WRAPPING A FLORAL GROUPING WITH EMBOSSED SHEETS HAVING ADHESIVE OR COHESIVE MATERIAL APPLIED THERETO", now U.S. Pat. No. 5,448,875, which is a continuation of U.S. Ser. No. 07/965,585, filed Oct. 23, 1992, entitled "WRAPPING A FLORAL GROUPING WITH SHEETS HAVING ADHESIVE OR COHESIVE MATERIAL APPLIED THERETO", now abandoned, which is a continuation of U.S. Ser. No. 07/893,586, filed Jun. 2, 1992, entitled "WRAPPING A FLORAL GROUPING WITH SHEETS HAVING ADHESIVE OR COHESIVE MATERIAL APPLIED THERETO", now U.S. Pat. No. 5,181,364, issued Jan. 26, 1993, which is a continuation of U.S. Ser. No. 07/707,417, filed May 28, 1991, entitled "WRAPPING A FLORAL GROUPING WITH SHEETS HAVING ADHESIVE OR COHESIVE APPLIED THERETO", now abandoned, which is a continuation of U.S Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned.

BACKGROUND

The present invention relates to methods of wrapping floral groupings and potted plants with a wrapper, in particular, but not limited to, wherein the floral grouping or potted plant comprises an orchid.

In the floral industry, when wrapping orchids for packing or shipment it is customary to use a waxed paper or waxed tissue paper. The wrapping must be delicate so that it does not bruise or otherwise damage the delicate orchids. However, waxed tissue paper tends to compress in the package. When compressed in such a way, the waxed tissue paper loses its cushioning effect and thus does not function effectively to protect the orchids.

A wrapping material which is relatively stiff while retaining the soft, cushioning effect of waxed tissue would be desirable for use in wrapping and packaging orchids.

BRIEF DESCRIPTION OF THE DRAWINGS

FIG. 1 is a perspective view of a sheet of material used in accordance with the present invention.

FIG. 2 is a sectional view of the sheet of FIG. 1.

FIG. 3 is a perspective view of a sheet of material having a floral grouping disposed thereon.

FIG. 4 is a perspective view of the floral grouping of FIG. 3 being wrapped in one method of wrapping.

DESCRIPTION

Figure 5:
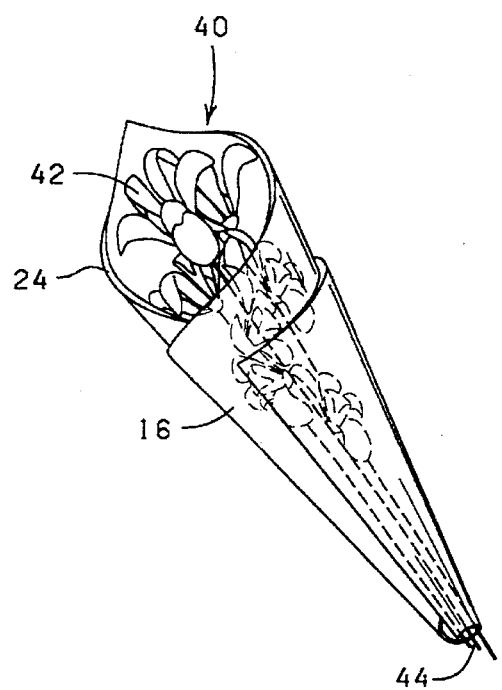
FIG. 5 is a perspective view of the floral grouping wrapped in a conical fashion.

The present invention comprises a method of wrapping a floral grouping or potted plant comprising an orchid. The method comprises providing the floral grouping or potted plant, providing a wrapper made from a sheet of material having a waxed paper laminated to both sides thereof and placing the wrapper about the floral grouping or potted plant forming a wrapped floral grouping or potted plant, respectively. The wrapper may be a laminated sheet of material or a sleeve or a preformed pot cover made from the sheet of laminated material. The wrapper may be further defined as having a portion which is detachable via a detaching means such as perforations. The wrapper may have a bonding material disposed thereon for bondingly holding the wrapper about the floral grouping or pot means.

THE EMBODIMENTS OF FIGS. 1–8

Referring now to FIG. 1, designated generally by the reference numeral 10 is a wrapper which is constructed in accordance with the present invention. The wrapper 10 is constructed from a laminated sheet of material 12. The sheet of material 12 has an upper surface 14, a lower surface 16, and an outer peripheral edge 18 (one corner of which is lifted for illustration purposes only). As shown in FIG. 1, the outer peripheral edge 18 of the sheet of material 12 comprises a first side 20, a second side 22, a third side 24, and fourth side 26. A bonding material 28 may optionally be disposed on at least a portion of one or both surfaces of the sheet of material 12, for example, as is illustrated in U.S. Pat. No. 5,181,364, the specification of which is hereby incorporated herein by reference. A decorative pattern 30 may be printed upon all or a portion of the wrapper 10. Possible components of the decorative pattern 30 may be a lace-like pattern, geometric shapes, curly-ques, paisleys, swirls, squiggles, and any shapes generally associated with botanical items such as leaves, petals, stems, roots, fruits and any other biomorphic shapes. The decorative pattern 30 may comprise a single color or a plurality of colors.

The wrapper 10 may comprise a sheet of material for wrapping a floral grouping or a pot; it may comprise a sleeve for wrapping or covering a floral grouping or pot; or it may comprise a preformed pot cover for covering a pot. Each of these versions of the present invention is described in more complete detail herein.

As noted above, the wrapper 10, when comprising the sheet of material 12, can be utilized to wrap a floral grouping or a flower pot. The term "flower pot" refers to any type of container used for holding a floral grouping or a plant. Examples of pots, used in accordance with the present invention include, but are not limited to, clay pots, wooden pots, plastic pots, pots made from natural and/or synthetic fibers, or any combination thereof. The pot is adapted to receive a floral grouping in the retaining space of the pot. The floral grouping may be disposed within the pot along with a suitable growing medium described in further detail below, or other retaining medium, such as a floral foam. It will also be understood that in some cases the floral grouping, and any appropriate growing medium or other retaining medium, may be disposed in a sleeve without a pot if the sleeve is adapted to contain a medium.

"Floral grouping" as used herein means cut fresh flowers, in particular orchids, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In the embodiment of FIG. 1, the sheet of material 12 is square. It will be appreciated, however, that any shape or size of sheet 12 may be used to wrap a flower pot or a floral grouping as long as it is sufficiently sized and shaped to wrap and encompass the flower pot or floral grouping. For example, the sheet 12 may also comprise other shapes, i.e., rectangular, round, oval, octagonal, asymmetrical, or the like. And multiple sheets of material 12 may be used in a single circumstance to wrap a pot or floral grouping. Moreover, when multiple sheets of material 12 are used in combination, the sheets of material 12 need not be uniform in size or shape. Finally, it will be appreciated that the sheet of material 12 shown in all embodiments herein is generally flattened.

As mentioned above, and shown in FIGS. 1 and 2, the sheet of material 12 is constructed of an inner support sheet of material 32 having an upper surface to which a first layer or sheet of waxy material (waxed paper or waxed tissue) 34 has been laminated or otherwise connected and having a lower surface to which a second layer or sheet of waxy material (waxed paper or waxed tissue) 36 has been laminated or otherwise connected. The sheets of waxed paper or waxed tissue are commercially available. Preferably the inner support sheet of material 32 is constructed from paper, cellophane, metal foil, polymer film, non-polymer film, fabric, cardboard, or laminations or combinations thereof. The inner sheet of material 32 may be comprised of two or more layers of material. It will also be understood that the sheet 12 may be formed with only a single layer of waxy material.

Any thickness or stiffness of the wrapper 10 may be utilized in accordance with the present invention as long as the wrapper 10 is flexible and may be wrapped about at least a portion of a flower pot or a floral grouping, as described herein. Stiffer sheets may be scored to facilitate their folding. The sheets of material 32, 34 and 36, preferably have thicknesses of less than about 0.1 mils to about 30 mils. Typically, the sheets of material 32, 34 and 36 have thicknesses in a range of less than about 0.2 mils to about 30 mils. In a preferred embodiment, the sheets of material 32, 34 and 36 are constructed from single sheets of material having thicknesses in a range of from less than about 0.5 mils to about 2.5 mils.

The term "polymer film" when used herein means a man-made polymer such as a polypropylene or a naturally occurring polymer such as cellophane. A polymer film is relatively strong and not as subject to tearing (substantially non-tearable), as might be the case with paper or foil.

The wrapper 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of the pot. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of sleeve and the size of the pot in the sleeve, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

In one embodiment, the sleeve may be constructed from two polypropylene films. The material comprising the sleeve may be connected together or laminated or may be separate layers. In an alternative embodiment, the sleeve may be constructed from only one polypropylene film.

The sheet of material 12 may vary in color. Further, the sheet of material 12 may comprise other decorative patterns or designs in addition to the lace pattern which are printed, etched, and/or embossed thereon. In addition, the sheet of material 12 may have various colorings, coatings, flocking and/or metallic finishes, applied separately or simultaneously or may be characterized totally or partially by pearlescent, opaque, translucent, transparent, tinted, iridescent or the like, qualities. Each of the above-named characteristics may occur alone or in combination. Moreover, each surface of the sheet of material 12 may vary in the combination of such characteristics. An example of an ink which may be applied to the surface of the material to print the patterns and designs described is described in U.S. Pat. No. 5,147,706, which is hereby incorporated herein by reference.

The sheet of material 12 has a width extending generally between the first side 20 and the second side 22, respectively, sufficiently sized whereby the sheet of material 12 can be wrapped about and encompass a floral grouping or a flower pot. The sheet of material 12 has a length extending generally between the third side 24 and the fourth side 26, respectively, sufficiently sized whereby the sheet of material 12 extends over a substantial portion of the floral grouping when the sheet of material 12 has been wrapped about the floral grouping in accordance with the present invention, as described in detail herein. The sheet of material 12 may also be wrapped about a flower pot to substantially wrap and cover the flower pot in accordance with the present invention.

FIGS. 3–6 illustrate the use of the present invention in wrapping a floral grouping. The sheet of material 12 (which is shown with an optional strip of bonding material 28 in FIG. 1, but which is shown without a bonding material in FIGS. 3–6) is provided, either as an individual sheet or from a pad or roll by any means or other described herein. Means for dispensing the sheet from a pad or roll of material are shown in U.S. Pat. Nos. 5,111,638 and 5,181,364, the specifications of which are hereby incorporated by reference herein.

The bonding material, if present may have a backing or release strip. Such backings or release strips are well known to those of ordinary skill in the art. The backing or release strip may be left applied for a period of time to the bonding material after it is disposed on a surface of the sheet of material 12 prior to its use as a wrapping material, to protect the bonding qualities of the bonding strip. In operation, an operator may dispose the sheet of material 12 on a support surface (not shown), the lower surface 16 of the sheet of material 12 contacting the support surface. A floral grouping such as the one referred to in FIG. 4 by the general reference numeral 40 is then provided, and disposed upon the upper surface 14 of the sheet of material 12. The floral grouping 40 may be any floral grouping having blooms or flowers but preferably comprises an orchid and generally has an upper end comprising a bloom or foliage portion 42 and a lower end comprising a stem portion 44. The floral grouping FIG. 40 may be disposed upon the sheet 12 in a diagonal orientation as shown in FIGS. 3–5.

Referring to FIGS. 3 and 4, the sheet of material 12 is then wrapped about the floral grouping 40 by the operator, the operator overlapping a portion of the sheet of material 12 over another portion of the sheet of material 12. That is, for example, the operator places the first side 20 of the sheet of material 12 over the floral grouping 40, as shown in FIG. 4. The operator continues to roll the floral grouping 40 in the direction toward the side 26 until the upper surface 14 near side 26 firmly engages the lower surface 16 of the sheet 12, wherein the floral grouping 40 is substantially encompassed by the sheet of material 12, and wherein the bonding material, if present, may contact both the sheet 12 and portions of the floral grouping 40 to substantially encompass and surround a substantial portion of the floral grouping 40. FIG. 5 shows the floral grouping 40 wrapped in a conical fashion with the bloom end 42 exposed near the open upper end of the wrapper 10 and the stem end 44 exposed near the lower end of the wrapper 10.

Figure 6:
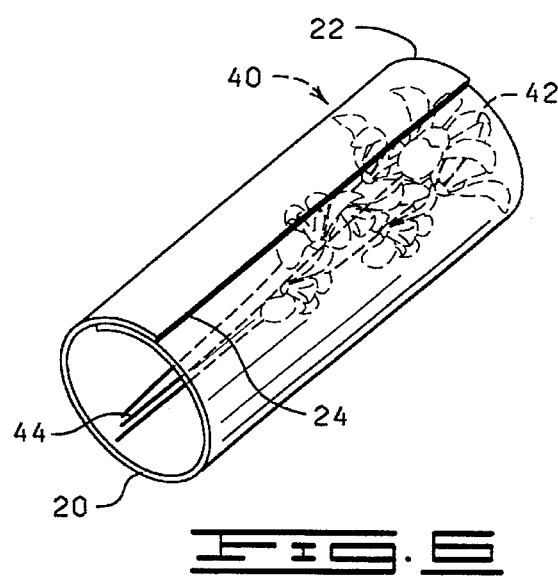
FIG. 6 is a perspective view of a method of using the sheet of material to wrap a floral grouping in a cylindrical fashion.

In another embodiment, illustrated in FIG. 6, the sheet of material 12 is utilized to wrap the floral grouping 40. The floral grouping 40 is disposed upon the sheet 12 approximately parallel to side 24 of the sheet 12. The sheet of material 12 is wrapped generally about the stem portion 44 of the floral grouping 40 to a position wherein the third side 24 generally overlaps the fourth side in a cylindrical fashion. It should be noted that the sheet of material 12 may be wrapped a plurality of times about the stem portion 44 of the floral grouping 40 before the overlapping of the third side 24 and the fourth side 26. As before, the portion of the sheet of material 12 near the third side 24 is disposed generally adjacent another portion of the sheet of material 12 and the two adjacent portions then are brought into contact where they may be bondingly engaged thereby securing the sheet of material 12 generally about the floral grouping 40.

The sheet of material (or any wrapper described elsewhere herein, such as a sleeve) once wrapped about the floral grouping functions under ordinary handling conditions to substantially prevent damage to the bloom portion of the floral grouping by crushing. Such damage may be, for example, breakage, bending, or bruising of the petals of the flowers of the bloom portion. By ordinary handling conditions is meant the manner typically employed in the floral industry to wrap floral groupings for storage, shipping or sale, especially floral groupings traditionally wrapped in wax paper such as orchids. The sheet of material (or other wrapper) functions to substantially prevent or minimize such damage by being less compressible when wrapped about a floral grouping than would be a wrapper made only from the sheet of waxed material used in forming the wrapper herein described. In other words, the wrapper claimed herein retains the benefits of a waxed wrapping material while adding the degree of stiffness necessary to reduce the chances that the wrapper will be excessively compressed against the floral grouping thereby causing damage to the floral grouping and especially to the bloom portion.

Figure 7:
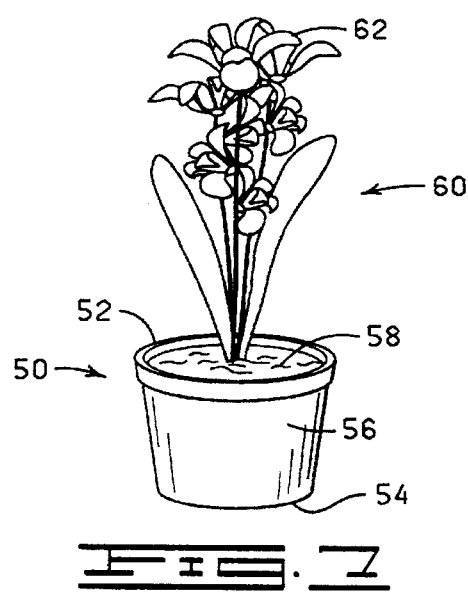
FIG. 7 is a perspective view of a potted plant such as may be wrapped by the method of the present invention.

In another version of the invention the sheet of material 12 may be used to wrap a pot means such as a potted plant, which preferably comprises an orchid in bloom. Shown in FIG. 7 is a pot designated by the reference numeral 50 and which has an upper end 52, a bottom end 54, an outer peripheral surface 56, an inner retaining space 58 within which may be disposed a growing medium. The pot 50 may contain a botanical item 60 such as a plant, preferably an orchid, which has an upper portion 62 comprising blooms or foliage or both.

Figure 8:
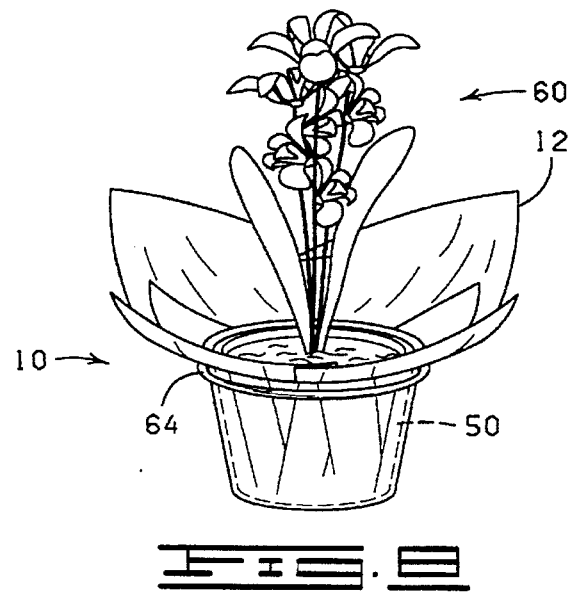
FIG. 8 is a potted plant wrapped in accordance with one version of the present invention.

The sheet of material 12 may be wrapped about the pot 50 by any one of numerous methods used to wrap sheets of material about pots to form decorative pot covers. The sheet of material 12 may, for example, be formed by hand about the outer peripheral surface 56 of the pot 50 and held thereto, for example, by a bonding means or material such as described elsewhere herein. For example, the wrapper 10 could be held about the pot 50 by an elastic band 64 such as shown in FIG. 8. The elastic band 64 could be applied manually or automatically such as by the method shown in U.S. Pat. No. 5,105,599 which is hereby incorporated herein by reference. The band 64 could be applied as a tie using a method such as described in "Single Station Covering and Fastening System", U.S. Ser. No. 08/252,876, the specification of which is hereby incorporated herein by reference. The sheet of material 12 could be applied automatically about the pot 60, for example, by methods shown in U.S. Pat. Nos. 4,733,521 and 5,291,721, both of which are hereby incorporated herein by reference.

The term "bonding material" or "bonding means" when used herein can mean an adhesive, frequently a pressure sensitive adhesive, or a cohesive or any adhesive/cohesive combination, having adhesive qualities (i.e., qualities of adhesion or adhesion/cohesion, respectively) sufficient to cause the attachment of a portion of the sheet 12 to itself, to a floral grouping, or to a flower pot. Since the bonding material may comprise either an adhesive or an adhesive/cohesive combination, it will be appreciated that both adhesives and cohesives are known in the art, and both are commercially available. When the bonding material is a cohesive, a similar cohesive material must be placed on the adjacent surface for bondingly contacting and bondingly engaging with the cohesive material. The term "bonding material or bonding means" also includes materials which are heat sealable and, in this instance, the adjacent portions of the material must be brought into contact and then heat must be applied to effect the seal. The term "bonding material or bonding means" also includes materials which are sonic sealable and vibratory sealable. The term "bonding material or bonding means" when used herein also means a heat sealing lacquer or hot melt material which may be applied to the material and, in this instance, heat, sound waves, or vibrations, also must be applied to effect the sealing.

The term "bonding material or bonding means" when used herein also means any type of material or thing which can be used to effect the bonding or connecting of the two adjacent portions of the material or sheet of material to effect the connection or bonding described herein. The term "bonding material or bonding means" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material or means. The cold seal adhesive adheres only to a similar substrate, acting similarly as a cohesive, and binds only to itself. The cold seal adhesive., since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material or bonding means" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

EMBODIMENTS OF FIGS. 9–15

Figure 9:
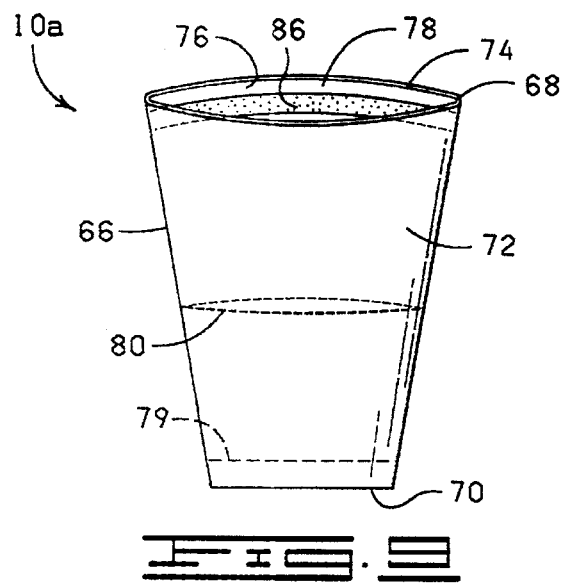
FIG. 9 is a perspective view of a floral sleeve used in accordance with the present invention.

Shown in FIG. 9 is a wrapper designated therein by the general reference numeral 10a which comprises a flexible bag or sleeve 66 of having unitary construction and constructed in accordance with the present invention. The sleeve 66 may be used as a wrapper 10a for a floral grouping 40 or a pot 50. The sleeve 66 initially comprises a flexible flat collapsed piece of material which is openable in the form of a tube or sleeve. Such sleeves and their method of construction are well known in the floral industry. The sleeve 66 may be tapered outwardly from the lower end toward a larger diameter at its upper end. In its flattened state the sleeve 66 generally has an overall trapezoidal or modified trapezoidal shape, and when opened is substantially frusto-conical to coniform. It will be appreciated, however, that the sleeve 66 may comprise variations on the aforementioned shapes or may comprise significantly altered shapes such as square or rectangular, wherein the sleeve 66 when opened has a cylindrical form, as long as the sleeve 66 functions in accordance with the present invention in the manner described herein. The sleeve 66 (or any other sleeve disclosed herein) may have an anular or contoured shape.

Figure 11:
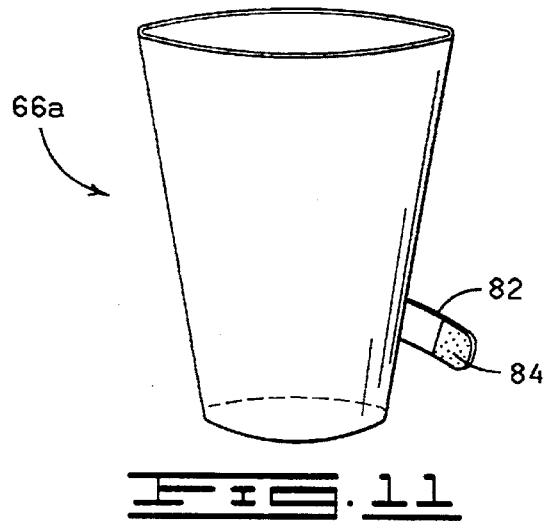
FIG. 11 is a perspective view of a sleeve having a cinching means.
Figure 12:
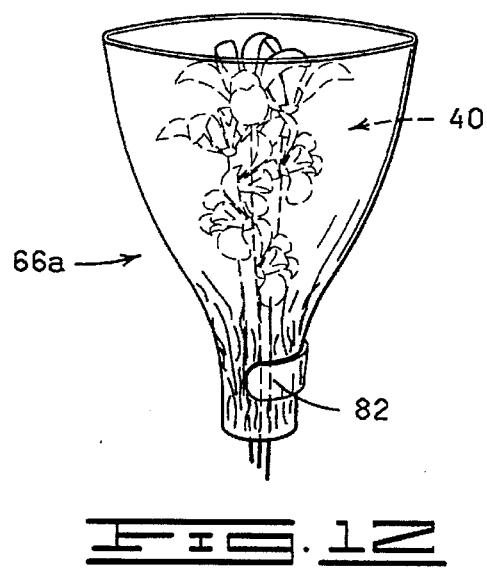
FIG. 12 shows the sleeve of FIG. 11 used to wrap a floral grouping.

The sleeve 66 has an upper end 68, a lower end 70, and an outer peripheral surface 72. The sleeve 66 has an opening 74 at the upper end 68 and may be open at the lower end 70, such as shown in FIG. 11, or closed with a bottom at the lower end 70, such as shown in FIG. 9. The sleeve 66 also has an inner peripheral surface 76 which, when the sleeve 66 is opened, defines and encompasses an inner retaining space 78 and which comprises the waxed paper or waxed tissue layer. When the lower end 70 of the sleeve 66 has a closed lower end 70, a portion of the lower end 70 may be inwardly folded to form one or more gussets 79 for allowing the lower portion of the inner retaining space 78 to be expandable, for example, for receiving the circular bottom of a pot or growing medium or floral grouping.

The sleeve 66 is generally frusto-conically shaped, but the sleeve 66 may be, by way of example but not by way of limitation, cylindrical, frusto-conical, a combination of both frusto-conical and cylindrical, or any other shape, as long as the sleeve 66 functions as described herein as noted above. Further, the sleeve 66 may comprise any shape, whether geometric, non-geometric, asymmetrical and/or fanciful as long as it functions in accordance with the present invention. The sleeve 66 may also be equipped with drain holes (if having a closed bottom) or side ventilation holes (not shown), or can be made from gas permeable or impermeable materials. The sleeve 66 may further comprise perforations 80 for enabling the separation of an upper portion of the sleeve above the perforations 80 from a lower portion of the sleeve below the perforations 80.

The material from which the sleeve 66 is constructed is the same as previously described above for the sheet of material 12. Such materials used to construct the sleeve 66 are further described in U.S. Pat. No. 5,111,637, which is hereby incorporated herein by reference. Any thickness of material may be utilized in accordance with the present invention as long as the sleeve 66 may be formed as described herein, and as long as the formed sleeve 66 may contain at least a portion of a pot 50 or a plant 60 or a floral grouping 40, as described herein. Additionally, an insulating material such as bubble film, preferably as one of two or more layers, can be utilized in order to provide additional protection for the item, such as the floral grouping 40, contained therein.

Figure 10:
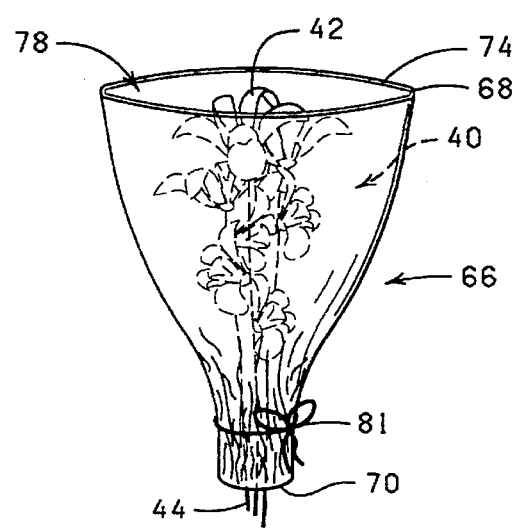
FIG. 10 is a sleeve used to wrap a floral grouping in accordance with the present invention.
Figure 13:
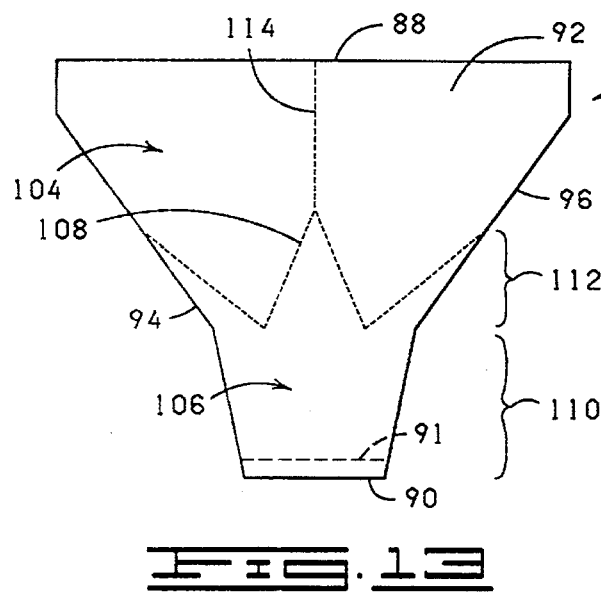
FIG. 13 is a side view of a sleeve having detaching means constructed in accordance with the present invention.

Shown in FIG. 10 is a sleeve 66 having a floral grouping 40 disposed within the inner retaining space 78 thereof. Generally, the upper portion 42 of the floral grouping 40 is exposed near the opening 74 of the sleeve 66 and the lower portion 44 of the floral grouping 40 is exposed near the lower end of the sleeve 66. Either end of the sleeve 66 may be closed about the floral grouping 40. Generally, a portion of the sleeve 66 is tightened about a portion of the stem portion of the floral grouping 40 for holding the wrapper 10a about the floral grouping 66. For example, the sleeve 66 may be held by a tie 81 tied about the sleeve 66 such as is shown in FIG. 10. Other means for binding the sleeve 66 may be employed such as the bonding means and materials described elsewhere herein. For example, a sleeve such as sleeve 66a in FIG. 11 has a cinching tab 82 having a bonding material 84 disposed upon a surface thereof. The cinching tab 82 can be used to gather portions of the sleeve 66a together about the stem portion of the floral grouping 40 as shown in FIG. 13 for holding the sleeve 66a tightly about the floral grouping 40.

Similarly, it may generally be desired to use the sleeve 66 as a wrapper for a pot 50. The pot 50 will generally contain a botanical item or plant 60. The pot 50 can be deposited into the open sleeve 66 in a manner well known in the art such as manually wherein the sleeve 66 is opened by hand and the pot 50b deposited therein.

As noted above, a bonding material 86 may optionally be disposed on a portion of the sleeve 66 or any sleeve described herein to assist in holding the sleeve 66 to the pot 50 when such a pot 50 is disposed within the sleeve 66 or to assist in closing the upper end 68 of the sleeve 66 or adhering the sleeve 66 to the pot 50 after the pot 50 has been disposed therein, as will be discussed in further detail below.

It will be understood that the bonding material, if present, may be disposed as a strip or block on a surface of the sleeve 66. The bonding material may also be disposed upon either the outer peripheral surface 72 or the inner peripheral surface 76 of the sleeve 66, as well as upon the pot 50. Further, the bonding material may be disposed as spots of bonding material, or in any other geometric, non-geometric, asymmetric, or fanciful form, and in any pattern including covering either the entire inner peripheral surface 76 and/or outer peripheral surface 72 of the sleeve 66 and/or the pot 50. The bonding material may be covered by a cover or release strip which can be removed prior to the use of the sleeve 66 or pot 50. The bonding material can be applied by means known to those of ordinary skill in their art. One method for disposing a bonding material, in this case an adhesive, is described in U.S. Pat. No. 5,111,637, which is hereby incorporated herein by reference.

As noted above, a bonding material 86 may be disposed on at least a portion of the inner peripheral surface 76 of the sleeve 66 (or any other sleeve described herein), or, alternatively, the bonding material may be disposed on the outer peripheral surface 72 of a pot 50 contained within the sleeve 66, while the sleeve 66 may be free of the bonding material. In a further alternative, the bonding material may be disposed both on at least a portion of the pot 50 as well as upon at least a portion of the inner peripheral surface 76 of the sleeve 66. In addition, a portion of the bonding material may also be disposed on the outer peripheral surface 72 of the sleeve 66 as well. It will be understood that the bonding material may be disposed in a solid section of bonding material. The bonding material when present is disposed on the sleeve 66 and/or pot 50 by any means known in the art.

Certain versions of sleeves described herein may be used in combination with a preformed plant cover. For example, a preformed pot cover may be applied to the pot, then the covered pot may be wrapped by or disposed within a sleeve. Examples of sleeves which may be used in this invention are shown in the specification of U.S. Ser. No. 08/237,078 which is hereby incorporated herein by reference in its entirety. Equipment and devices for forming sleeves are commercially available, and well known in the art.

Figure 14:
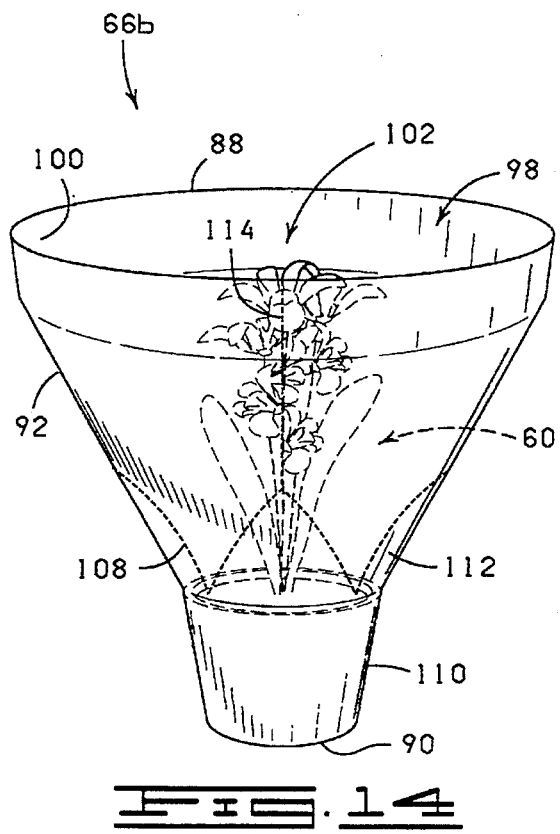
FIG. 14 is a perspective view of the sleeve of FIG. 13 with a potted plant disposed therein.

Shown in FIGS. 13 and 14 is another wrapper comprising a sleeve constructed in accordance with the present invention and designated by the general reference numeral 66b. The sleeve 66b has a "detaching" element in predetermined areas for detaching a portion of the sleeve 66b. The sleeve 66b generally initially comprises a flexible flat collapsed piece of material having sealed side edges 94 and 96 and which is openable in the form of a tube or sleeve. The sleeve 66b is constructed of the same material and in the same way as described previously herein and may be described exactly the same as the other sleeves described herein except for the additional elements described herein.

The sleeve 66b has an upper end 88, a lower end 90, an outer peripheral surface 92 and in its flattened state has a first edge 94 and a second edge 96. The sleeve 66b has an opening 98 at the upper end 88 and may be open at the lower end 90, or closed with a bottom at the lower end 90. The sleeve 66b also has an inner peripheral surface 100 which, when the sleeve 66b is opened, defines and encompasses an inner retaining space 102 as shown in FIG. 14. When the lower end 90 of the sleeve 66b has a closed bottom a portion of the lower end 90 may be inwardly folded to form one or more gussets 91 for permitting a circular bottom of an object such as a potted plant 50 to be disposed into the inner retaining space 102 of the lower end 90 of the sleeve 66b.

As shown in FIGS. 13 and 14, the sleeve 66b is demarcated into an upper portion 104 and a lower portion 106. The lower portion 106 of the sleeve 66b is generally sized to contain the pot 50. The upper portion 104 of the sleeve 66b is sized to substantially surround and encompass a plant 60 contained in the pot 50 disposed within the lower portion 106 of the sleeve 66b. The sleeve 66b is demarcated into the upper portion 104 and the lower portion 106 by a detaching element 108 for enabling the detachment of the upper portion 104 of the sleeve 66b from the lower portion 106 of the sleeve 66b. In the present version, the detaching element 108 is a plurality of generally laterally-oriented, alternatingly diagonally-oriented, or curved perforations which extend circumferentially across the outer peripheral surface 92 of the sleeve 66b from the first side 94 to the second side 96.

In a preferred embodiment, as shown in FIGS. 13 and 14, the lower portion 106 of the sleeve 66b further comprises a base portion 110 and a skirt portion 112. The base portion 110 comprises that part of the lower portion 106 which, when the pot 50 is placed into the lower portion 106, has an inner peripheral surface which is substantially adjacent to and surrounds the outer peripheral surface of the pot 50. The skirt portion 112 comprises that part of the lower portion 106 which extends beyond the upper rim 52 of the pot 50 and adjacent at least a portion of the plant 60 contained within the pot 50 and which is left to freely extend at an angle, inwardly or outwardly, from the base portion 110 when the upper portion of 104 the sleeve 66b is detached from the lower portion 106 of the sleeve 66b by actuation of the detaching means 108.

In the intact sleeve 66b, the skirt portion 112 comprises an upper peripheral edge congruent with the detaching element 108 which is connected to a lower peripheral edge, also congruent with the detaching element 108, of the upper portion 104 of the sleeve 66b. In FIGS. 13 and 14, the upper peripheral edge of the skirt portion 112 is congruent with a series of alternatingly diagonally-oriented lines of perforations which together form a zig-zag and comprise the detaching element 108. The upper portion 104 of the sleeve 66b may also have an additional detaching element 114 indicated as a plurality of vertical perforations for facilitating removal of the upper portion 104 and which are disposed more or less vertically therein extending between the detaching element 108 of the sleeve 66b.

Figure 15:
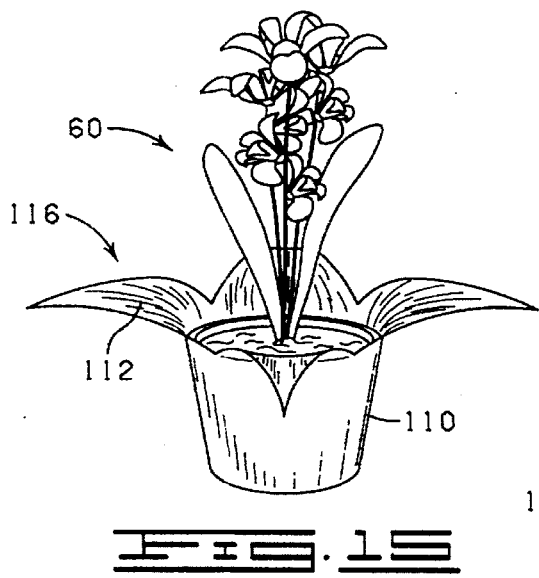
FIG. 15 is a perspective view of a potted plant disposed in the sleeve of FIG. 13 after an upper portion of the sleeve has been removed to provide a pot cover having a skirt.

The upper portion 104 of the sleeve 66b is thereby separable from the lower portion 106 of the sleeve 66b by tearing the upper portion 104 along both the vertical perforations 114 and the detaching element 108, thereby separating the upper portion 104 from the lower portion 106 of the sleeve 66b. The lower portion 106 of the sleeve 66b remains disposed as the base portion 110 about the pot 50 and as the skirt portion 112 about the plant 60 forming a decorative cover 116 as shown in FIG. 15 which substantially surrounds and encompasses the pot 50 and the plant 60 contained therein. In one version of the invention, only the skirt 112 and upper portion 104 of the sleeve may be constructed of the waxed paper laminate, while the base portion is constructed of another material.

"Detaching element" or "detaching means" as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, tear starts, zippers, or any other "detaching elements" known in the art, or any combination thereof, could be substituted therefor and/or used therewith.

In a general method of use of sleeves 66–66b as a wrapper for a pot, an operator provides a sleeve 66–66b, and a pot 50 having a plant 60 disposed in a growing medium contained within the pot 50. The operator then disposes the pot 50 having the plant 60 contained therein into the sleeve by opening the sleeve at its first end and assuring both that the opening therein is in an open condition, and that the inner peripheral surface of the sleeve is somewhat expanded outward as well, as shown in FIG. 14. The operator then manually or automatically disposes the pot 50 into the opening in the sleeve, the pot 50 being disposed generally through the upper portion of the sleeve into generally the lower portion of the sleeve, the pot remaining in the lower portion of the sleeve, permitting the sleeve to substantially surround and tightly encompass the pot. It will be understood that alternatively, the sleeve may be equipped with holes to facilitate the carrying or support of the sleeve on rods, or wickets and the pot then being disposed in the sleeve either before or after the sleeve has been removed from the wickets.

EMBODIMENTS OF FIGS. 16–17

Figure 16:
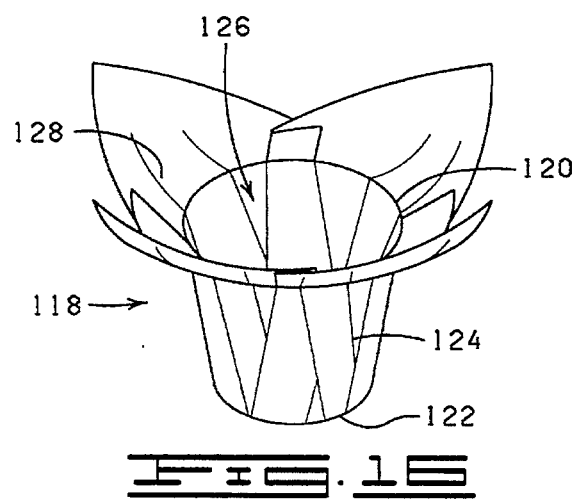
FIG. 16 is a perspective view of a preformed pot cover used in accordance with the present invention.

In another version of the invention, the wrapper may be a decorative preformed plant cover which is used to substantially surround and encompass a pot or potted plant. Shown in FIG. 16 is a decorative preformed pot cover designated by the numeral 118.

Figure 17:
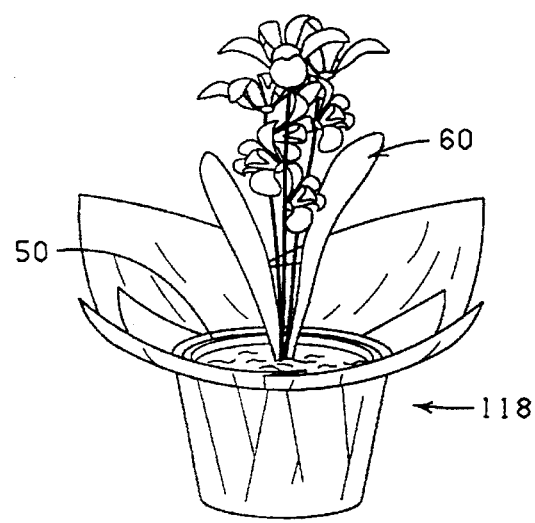
FIG. 17 is a perspective view of the preformed pot cover of FIG. 16 having a pot disposed therein.

The decorative plant cover 118 has an upper end 120, a lower end 122, and an outer peripheral surface 124. An opening 126 intersects the upper end 120, forming an inner peripheral surface 128 which defines and encompasses a retaining space within which the pot 50 or potted plant may be disposed in a manner well known in the art and which is shown in FIG. 17.

Methods for forming such preformed decorative pot covers are well known in the art. Two methods of forming such covers are described in U.S. Pat. Nos. 4,773,182 and 5,291,721, both of which are hereby incorporated by reference herein.

Further, in accordance with the present invention, the preformed pot cover 118 is constructed from the same materials described herein above for the construction of the sheet of material 12 and may have a bonding means or material disposed upon a portion thereof.

EMBODIMENTS OF FIGS. 18–20

Figure 18:
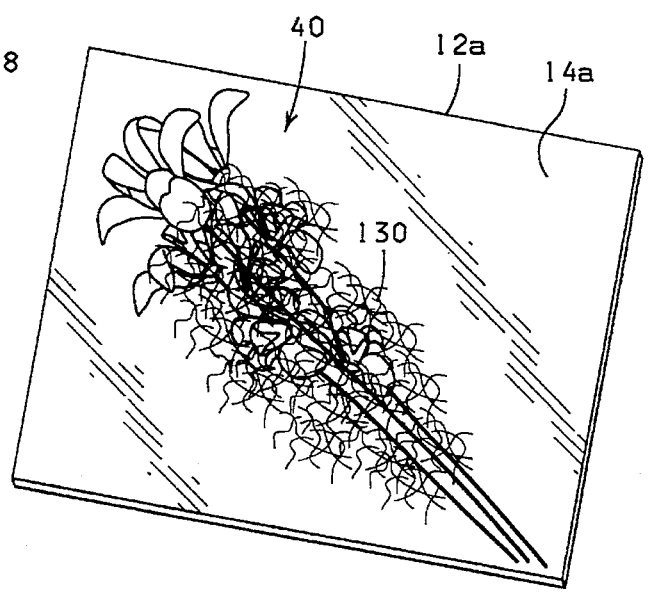
FIG. 18 is a perspective view of a sheet of material having a shredded material and floral grouping disposed thereon.
Figure 19:
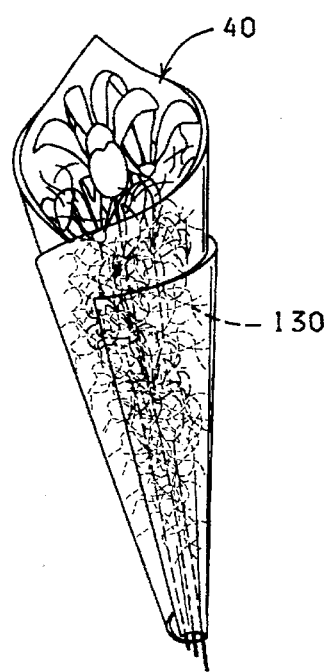
FIG. 19 is a perspective view of the sheet and floral grouping of FIG. 18 conically wrapped.

In an alternate version of the invention, the floral grouping may be wrapped with a quantity of a shredded material 130 for providing a cushion when the floral grouping is wrapped with a sheet of material or with a sleeve as described above. The shredded material is preferably formed by shredding the same material as comprises the sheet of material 12. The material may be shredded using shredding means such as are well known in the art, for example, using a paper shredding device. The shredded material may be placed upon the wrapping surface 14a of a sheet of material 12a along with a floral grouping 40, as shown in FIG. 18. The sheet 12a is then wrapped about the floral grouping 40 and shredded material 130 in a manner described above to form a wrapped floral grouping such as the wrapped floral grouping shown in FIG. 19.

Figure 20:
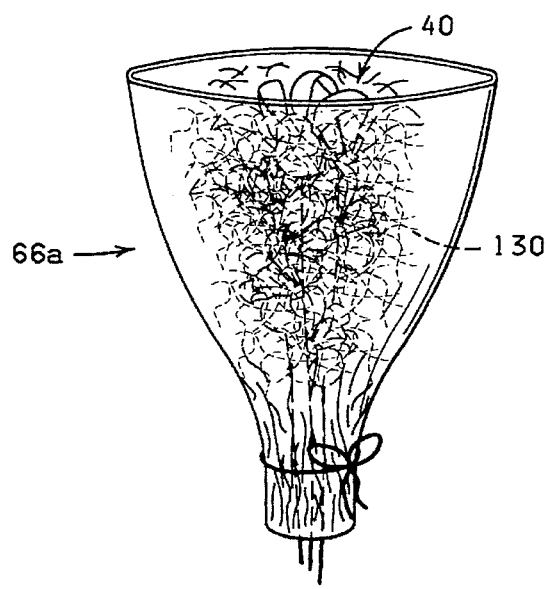
FIG. 20 is a perspective view of a floral grouping and shredded material wrapped within a sleeve.

Alternatively, the shredded material 130 may be placed within the inner space of a sleeve 66a along with a floral grouping 40 and the sleeve 66a wrapped about the floral grouping 40 and shredded material 130 in a manner disclosed above to form a wrapped floral grouping such as is shown in FIG. 20. In one version of the sheet of material 12a shown in FIG. 18 the wrapping surface comprises the exposed surface of any one of the materials described above which may be used in the construction of any one of the layers of the sheet of material 12. In a preferred version, the wrapping surface 14a of the sheet of material comprises a waxed paper or waxed tissue as described above. In one version of the sleeve 66a shown in FIG. 20 the inner surface of the sleeve 66a comprises the exposed surface of any one of the materials described above including those not having waxed paper or tissue connected or laminated thereto which may be used in the construction of any one of the layers of the sheet of material 12. In a preferred version, the inner surface of the sleeve 66a comprises a waxed paper or waxed tissue connected or laminated to a sheet of material as described above.

Changes may be made in the construction and the operation of the various components, elements and assemblies described herein or in the steps or the sequence of steps of the methods described herein without departing from the spirit and scope of the invention as defined in the following claims.

What is claimed is:

1. A method of wrapping a floral grouping and comprising:

providing a floral grouping comprising a bloom portion;

providing a flexible preformed tubular sleeve having an outer surface, an inner surface, an upper end, a lower end and an inner space into which the floral grouping is disposable and which is accessible through the upper end, the sleeve constructed from a material comprising a waxy layer and a support layer, the waxy layer superposed upon a surface of the support layer and connected thereto and forming the inner surface of the sleeve, and wherein the waxy layer is constructed from a separate sheet of waxed material, and wherein the sleeve, when wrapped about the floral grouping, is less compressible about the floral grouping than would be a sleeve formed from a sheet of the waxed material alone; and opening the sleeve and placing the floral grouping within the inner space of the sleeve such that the waxy layer is positioned adjacent the bloom portion of the floral grouping forming a wrapped floral grouping.

2. The method of claim 1 wherein in the step of providing a floral grouping, the floral grouping comprises an orchid.

3. The method of claim 1 wherein in the step of providing the sleeve, the sleeve is constructed from a transparent, translucent or opaque material.

4. The method of claim 1 wherein in the step of providing the sleeve, the sleeve is further defined as constructed from a material having a thickness in a range of from about 0.1 mils to about 30 mils.

5. The method of claim 1 wherein in the step of providing the sleeve, the sleeve is further defined as constructed from a material having a thickness in a range of from about 0.5 mils to about 10 mils.

6. The method of claim 1 wherein in the step of providing the sleeve, the sleeve is further defined as constructed from a material having a thickness in a range of from about 1 mil to about 5 mils.

7. The method of claim 1 wherein in the step of providing the sleeve, the sleeve is further defined as having a portion which is detachable via a detaching means.

8. The method of claim 1 wherein in the step of placing the sleeve about the floral grouping, bonding means is used for bondingly holding the sleeve about the floral grouping.

9. The method of claim 1 wherein in the step of providing the sleeve, the support layer is defined as constructed from a material selected from the group consisting of treated or untreated paper, cellophane, metal foil, polymer film, non-polymer film, cardboard, cloth, burlap, and laminations or combinations thereof.

10. The method of claim 1 wherein in the step of providing the sleeve, the has a bonding material thereon for bondingly connecting a portion of the sleeve together for holding the sleeve in a wrapped position about the floral grouping.

11. The method of claim 1 comprising the additional step of sealing the upper end of the sleeve about the floral grouping.

12. The method of claim 1 comprising the additional step of sealing the lower end of the sleeve about the floral grouping.

13. The method of claim 1 comprising the additional step of sealing both the upper end and the lower end of the sleeve about the floral grouping.

14. The method of claim 1 comprising the additional step of providing a shredded material and placing a quantity of the shredded material within the inner space of the sleeve generally about the bloom portion of the floral grouping for cushioning the bloom portion.

15. The method of claim 1 wherein the shredded material is further defined as comprising shreds having a first waxy layer, a support layer, and a second waxy layer, the support layer sandwiched between the first waxy layer and the second waxy layer, the first waxy layer and the second waxy layer comprising a waxed paper, and the first waxy layer and the second waxy layer connected to alternate sides of the support layer.

16. The method of claim 1 wherein after the step of placing the floral grouping within the sleeve, damage to the bloom portion of the floral grouping by crushing is substantially prevented by the sleeve under ordinary handling conditions.

17. A method of wrapping a floral grouping and comprising:

providing a floral grouping comprising a bloom portion;

providing a flexible preformed tubular sleeve having an outer surface, an inner surface, an upper end, a lower end and an inner space surrounded by the inner surface and into which the floral grouping is disposable and which is accessible through the upper end, the sleeve constructed from a material comprising a first waxy layer, a second waxy layer and a support layer, the first waxy layer superposed upon and connected to a first surface of the support layer and the second waxy layer superposed upon and connected to a second surface of the support layer and forming the inner surface of the sleeve, and wherein each waxy layer is constructed from a separate sheet of waxed material, and wherein the sleeve, when wrapped about the floral grouping, is less compressible about the floral grouping than would be a sleeve formed from a sheet of the waxed material alone; and opening the sleeve and placing the floral grouping within the inner space of the sleeve such that the second waxy layer is positioned adjacent the bloom portion so as to substantially encompass the bloom portion of the floral grouping forming a wrapped floral grouping.

18. The method of claim 17 comprising the additional step of sealing the upper end of the sleeve about the floral grouping.

19. The method of claim 17 comprising the additional step of sealing the lower end of the sleeve about the floral grouping.

20. The method of claim 17 comprising the additional step of sealing both the upper end and the lower end of the sleeve about the floral grouping.

21. The method of claim 17 comprising the additional step of providing a shredded material and placing a quantity of the shredded material within the inner space of the sleeve generally about the bloom portion of the floral grouping for cushioning the bloom portion.

22. The method of claim 21 wherein the shredded material is further defined as comprising shreds having a first waxy layer, a support layer, and a second waxy layer, the support layer sandwiched between the first waxy layer and the second waxy layer, the first waxy layer and the second waxy layer comprising a waxed paper, and the first waxy layer and the second waxy layer connected to alternate sides of the support layer.

23. The method of claim 17 wherein in the step of providing a floral grouping, the floral grouping comprises an orchid.

24. The method of claim 17 wherein after the step of placing the floral grouping within the sleeve, damage to the bloom portion of the floral grouping by crushing is substantially prevented by the sleeve under ordinary handling conditions.

* * * * *

UNITED STATES PATENT AND TRADEMARK OFFICE
CERTIFICATE OF CORRECTION

PATENT NO. : 5,661,950

DATED : September 2, 1997

INVENTOR(S) : Weder

It is certified that error appears in the above-identified patent and that said Letters Patent is hereby corrected as shown below:

On page 2, under "U.S. Patent Documents", seventh reference, after "2,989,828", please delete "9/1961" and substitute therefor --6/1961--.

Column 7, line 40, please delete "pot 60" and substitute therefor --pot 50--.

Column 8, line 21, after "adhesive", please delete ".".

Column 8, line 65, please delete "anular" and substitute therefor --angular--.

Column 9, line 51, please delete "floral grouping 66" and substitute therefor --floral grouping 40--.

Column 13, line 12, after "wrapping surface", please insert --14a--.

Column 14, line 18, after "the sleeve, the", please insert --sleeve--.

UNITED STATES PATENT AND TRADEMARK OFFICE
CERTIFICATE OF CORRECTION

PATENT NO. : 5,661,950
DATED : September 2, 1997
INVENTOR(S) : Weder

It is certified that error appears in the above-identified patent and that said Letters Patent is hereby corrected as shown below:

Column 14, line 35, please delete "claim 1" and substitute therefor --claim 14--.

Signed and Sealed this

Twenty-first Day of April, 1998

Attest:

BRUCE LEHMAN

Attesting Officer

Commissioner of Patents and Trademarks